United States Patent [19]

Adams et al.

[11] Patent Number: 4,793,677

[45] Date of Patent: Dec. 27, 1988

[54] ELECTRO-OPTIC DEVICES WITH WAVEGUIDE AND HAVING SMALL SPATIAL SPREAD OF APPLIED ELECTRIC FIELD

[75] Inventors: Michael J. Adams; Michael J. Robertson; Paul M. Rodgers; Simon Ritchie, all of Ipswich, England

[73] Assignee: British Telecommunications Public Limited Company, Great Britain

[21] Appl. No.: 918,108

[22] Filed: Oct. 14, 1986

[30] Foreign Application Priority Data

Oct. 17, 1985 [GB] United Kingdom ............... 8525593

[51] Int. Cl.$^4$ ............................................. G02B 1/015
[52] U.S. Cl. ................................................... 350/96.14
[58] Field of Search .................. 350/96.14; 372/45, 46

[56] References Cited

U.S. PATENT DOCUMENTS

| 3,748,597 | 7/1973 | Reinhart | 333/7.51 |
| 3,994,566 | 11/1976 | Lotspeich et al. | 350/160 |
| 4,196,964 | 4/1980 | Paprichon | 350/96.14 |

FOREIGN PATENT DOCUMENTS 54-0000186 1/1979 Japan ............................ 350/96.14

OTHER PUBLICATIONS

"Fabrication of Modulators and Switches in GaAs--Based Semiconductor Materials", A. J. N. Houghton & R. M. Rodgers, British Telecom Research Labs. Martlesham Heath, Ipswich, IP5 7RE UK, pp. 65-68.
2nd European Conference on Integrated Optics, Venice, Oct. 17th-18th 1983, pp. 65-67, A. J. N. Houghton, et al.: "Fabrication of Modulators and Switches in GaAs-Based Semiconductor Materials".

Primary Examiner—John D. Lee
Assistant Examiner—Phan Heartney
Attorney, Agent, or Firm—Nixon & Vanderhye

[57] ABSTRACT

An opto-electronic device, comprising an optical waveguide and means for imposing an electrical field in a direction transverse to the waveguide, is designed such that the spatial spread of the electrical field is very small. The electrical field overlies the region of peak amplitude of the profile of optical radiation in the waveguide. Constructed principally out of semiconductor materials made from elements selected from the III and V groups of the Periodic Table, the device lends itself to monolithic integration in optical communications systems.

19 Claims, 3 Drawing Sheets

ELECTRO-OPTIC DEVICES WITH WAVEGUIDE AND HAVING SMALL SPATIAL SPREAD OF APPLIED ELECTRIC FIELD

The present invention relates to the field of optical communications and particularly to electro-optic devices.

Electro-optic devices are used in optical communication systems for switching and modulation of optical signals. The switching and modulation are achieved by means of the effect of an electrical field on the refractive index of the materials within the device.

An electro-optic device for use in switching and modulation generally comprises an optical waveguide and means for imposing an electrical field across the waveguide. Optical radiation transmitted in a particular mode by the waveguide is confined to a beam having a particular amplitude profile and spot size $w_o$ by means of the spatial distribution of the refractive index of the waveguide material.

When an electrical field is imposed on the waveguide material, across the beam, it causes a change in the refractive index of the material and a consequent change in the propagation constant of the beam. The latter reflects in a change in the phase of the radiation at the output of the device. Variation in the strength of the electrical field results in variation of the change in phase. The response of the phase to changes in the electrical field, $d\phi$ per volt, is a measure of the efficiency of the electro-optic device and in general is preferably maximised.

Electro-optic devices can be used directly at phase modulators, or in directional couplers, Mach-Zehnder interferometers or other waveguide devices. The control of refractive index offered by the devices can be used directly, in phase modulation of an optical signal, or indirectly. For instance the Mach-Zehnder interferometer produces intensity modulation by phase-modulating an optical signal in one of two arms of the interferometer. When the signals from the two arms are combined they interfere with each other according to the phase modulation to produce an intensity modulated signal.

There are factors in the design of an electro-optic device which are important in addition to a maximised $d\phi$. For instance, it is usually important that the optical loss it introduced to a communications system should be low. It should also be easy to manufacture and, in the future, it is likely to be important that a device can be integrated monolithically with other components of a system.

A factor in the choice of materials for device is the fact that silica optical fibres as produced in the past, and in more recent years, have loss minima at 0.9 μm, 1.3 μm and 1.55 μm approximately. Accordingly there is an especial need for devices which show favourable characteristics when operated using optical radiation in the wavelength range from 0.8 to 1.65 μm, and especially in the ranges from 0.8 to 1.0 μm and 1.3 to 1.6 μm. (These wavelengths, like all the wavelengths herein except where the context indicates otherwise, are in vacuo wavelengths). Materials which have been found suitable for the manufacture of electro-optic devices with the required favourable characteristics comprise the III-V semiconductor materials, including gallium arsenide, indium gallium arsenide, gallium aluminium arsenide, indium phosphide and the quaternary materials, indium gallium arsenide phosphides ($In_xGa_{1-x}As_yP_{1-y}$). By suitable choices of x and y it is possible to lattice-match regions of different ones of these quaternary materials to neighbouring III-V materials in a device while being able to select the associated refractive index. (The refractive index of a quaternary material can be determined from its bandgap equivalent wavelength with reference to published literature. In turn, the bandgap equivalent wavelength can be determined experimentally by, for example, photoluminescence).

Electro-optic devices have been manufactured using the III-V semiconductor materials showing propagation losses as low as 0.2 dB/cm. They allow great design flexibility while being relatively simple to produce using epitaxial growth techniques and, in the future, it seems highly likely that they will lend themselves to monolithic integration with other components, such as semiconductor lasers, of an optical communications system. They are therefore a very advantageous form of device.

It is not a necessary feature of electro-optic devices that the electrical field profile should extend across the full cross section of the waveguide. For instance, a semiconductor electro-optic device may comprise layers of differently doped materials, incorporating a reverse-biased p-n junction. An electrical field appears essentially only in the depletion layer produced at the junction. The doping levels in the layers as well as the voltage applied determine the thickness of the depletion layer and the extent of the electrical field profile can therefore be determined by the design of the device.

In the past it has been thought that to maximise $d\phi$, the optical and electrical field profiles in an opto-electronic device should overlap as far as possible. This was thought to allow changes in the electrical field to have the greatest possible effect on the material in the optical field, and therefore to maximise $d\phi$. It has now been found that very surprisingly this is not the case.

An object of the present invention is to provide an opto-electronic device having improved efficiency.

According to the present invention there is provided an opto-electronic device comprising an optical waveguide for transmitting an optical beam, and means for applying an electrical field in a direction across the waveguide transverse to the beam, wherein the spatial spread of the electrical field in that direction is less than the beam spot size $w_o$ in that direction, the electrical field overlying the optical beam in the region of its peak amplitude.

Preferably the spatial spread of the electrical field in the waveguide is very small. For instance, in a waveguide in which the beam spot size is $w_o$, the spatial spread of the electrical field in the waveguide should preferably be less than $w_o/3$, more preferably less than $w_o/5$, and more preferably still of the order of $w_o/10$ or less.

Beam spot size $w_o$ in this specification is used to indicate the distance between the 1/e points of the amplitude distribution of the beam cross section, in the direction (the measurement direction) in which the spatial spread of the electrical field is considered.

Preferably the spatial spread of the electrical field should actually encompass the peak optical amplitude of the beam.

It is advantageous if the amplitude profile of the optical beam is substantially symmetrical, at least in the measurement direction. This allows the position of the peak amplitude of the beam to be more easily predicted.

Design of the waveguide so that the electric field overlies the region of the peak optical amplitude of the beam is then considerably simplified.

Symmetry of the amplitude profile of the optical beam in the measurement direction can be achieved by using a refractive index distribution which is symmetrical in that direction. It is not necessary that the symmetry should be perfect. It is sufficient for instance if the waveguide comprises a region of the material bounded on each side by a cladding region of material of lower refractive index, all the materials being selected from semiconductors made from elements in the III and V groups of the periodic table. These materials all have refractive indices which are greater than 3. The materials of the cladding regions do not have to be the same materials on each side.

It is also preferable that the spread of the electrical field is sharply defined. That is, that the amplitude profile of the field has very steep flanks. This can be achieved satisfactorily in a device where the electrical field is confined by means of boundaries between regions of materials having different carrier doping levels, by using a difference factor in the doping levels at each boundary of the order of at least 5 and preferably of an order of magnitude or greater. The absolute magnitude of the doping levels should be at least $10^{16}$ cm$^{-3}$.

A phase modulator according to an embodiment of the present invention will now be described with reference to the accompanying figures in which.

Although terms such as "above" are used in the present specification, they should not be taken to imply a necessary orientation of embodiments of the invention. They are used for convenience of description only.

Figure 1:
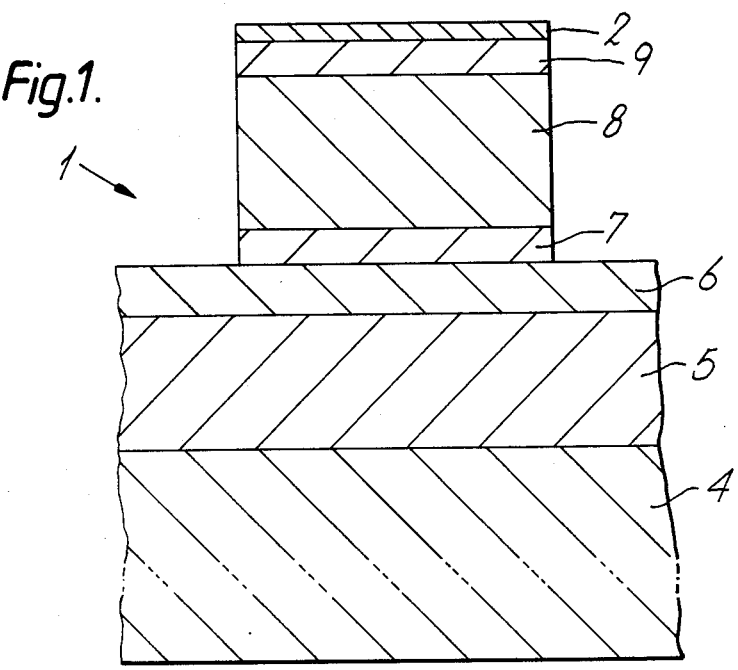
FIG. 1 shows a cross section of the phase modulator, not drawn to scale.

Referring to FIG. 1, the phase modulator 1 comprises a ridge waveguide provided with an electrode 2.

The ridge waveguide is a symmetrical slab waveguide having the following layers grown by liquid phase epitaxy (LPE) on a [100] oriented n+ (having a doping level of $2 \times 10^{18}$ cm$^{-3}$) InP substrate 4:

(i) an n-doped ($2 \times 10^{17}$ cm$^{-3}$) InP buffer layer 5 of thickness at least 0.2 μm; and (ii) an n-doped ($2 \times 10^{16}$ cm$^{-3}$) InGaAsP guide layer 6 of bandgap wavelength $\lambda = 1.07$ μm, and thickness 0.18 μm.

The thickness of the buffer layer 5 is preferably selected to be of the order of $w_o/2$ or more. If it is too thin, optical losses can occur in the substrate 4. In the present example, the beam spot size $w_o$ is about 2 μm, hence the buffer layer 5 should be of the order of 1 μm thick.

On top of the above layers, the following additional layers are grown by metal organic vapour phase epitaxy (MOVPE):

(iii) an n-doped ($2 \times 10^{16}$ cm$^{-3}$) InP cladding layer 7;

(iv) a p-doped ($2 \times 10^{17}$ cm$^{-3}$) InP cladding layer 8; and (v) a p-doped ($2 \times 10^{19}$ cm$^{-3}$) InGaAs layer 9 for making a good contact between the ridge of the ridge waveguide and the electrode 2.

A titanium-nickel electrode 2 of width 3 μm is deposited on top of the InGaAs layer 9 and used as a mask to produce the ridge by chemical etching. The electrode 2 is positioned such that the direction of propagation of optical radiation in the finished waveguide is $<110>$. The walls of the ridge extend down as far as, but not into, the guide layer 6.

The two cladding layers 7, 8 together make a layer of about 1 μm and the p-n junction produced between the cladding layers 7,8 lies less than 0.1 μm from the guide layer 6. The thickness of the guide layer 6, 0.18 μm, is such as to permit single mode operation of the waveguide.

The modulator was cleaved to a length of 3.6 mm.

A voltage can be applied across the modulator 1 by making contacts with the electrode 2 and with the exposed face of the substrate 4.

The techniques of LPE, MOVPE, chemical etching and metallisation are all known and are not therefore described herein.

Measurements of the change in phase of radiation propagating in the waveguide, per volt of the imposed electrical field, were made. Radiation of wavelength 1.32 μm, supplied by a Nd: Y A G laser, and of wavelength 1.15 μm, supplied by a HeNe laser, were used. (It could be expected that radiation of wavelength 1.55 μm could also have been used.)

Figure 2:
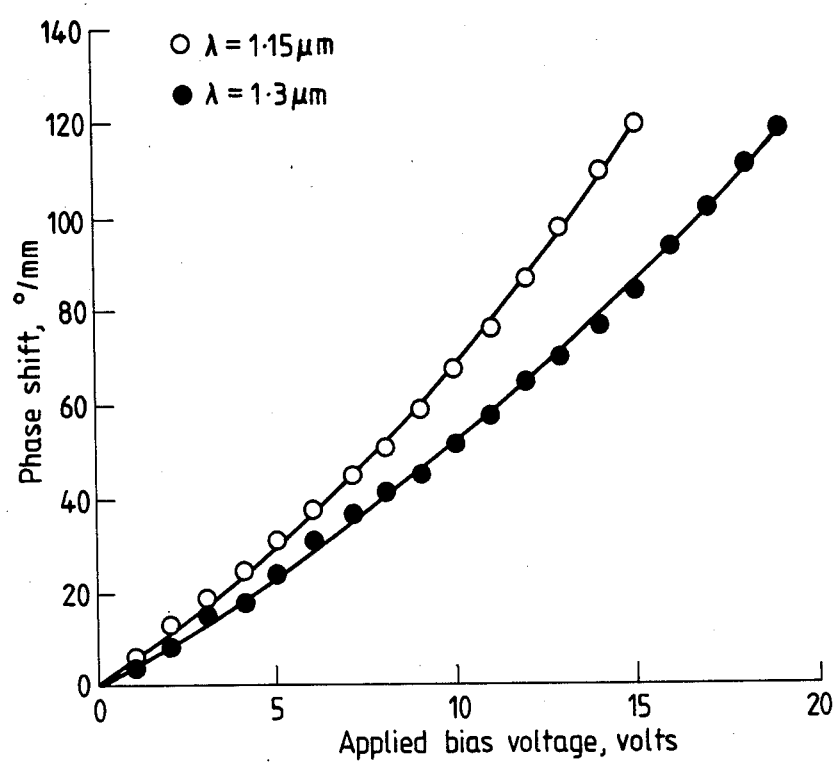
FIG. 2 shows a graph of the phase change $\phi$ per unit length of the modulator plotted against the voltage of an applied electrical field.

Referring to FIG. 2, the average phase shift per unit length of the waveguide and per volt of the electrical field, over a voltage range of 0 to 15 V, was found to be 6°/V mm at 1.3 μm and 8°/V mm at 1.15 μm. Electroabsorption effects were observed at the shorter wavelength but not at 1.3 μm.

At voltages of less than 10 V, the linear electro-optic effect was found to be dominant. At higher voltages, a non-linear characteristic appears. The differential phase shift $d\phi/dV$ at 15 volts was found to be 8°/Vmm at 1.3 μm and in excess of 10°/Vmm at 1.15 μm.

The length of the devices measured, 3.6 mm, allowed modulation voltages of $V\pi = 7$ V using radiation of 1.3 μm ($V\pi$ being the modulation voltage necessary for 180° phase voltages). Clearly $\pi$ radian (or 180°) phase voltages of less than 5 volts are practical with devices of the type described above.

A phase modulator of a slightly different design, having a contact 2 to the ridge of width 4 μm, and therefore a ridge of that width, gave results similar to those given by the modulator described above and FIG. 2 shows a combination of the results given by both modulators.

The structure of, and growth techniques used for, the phase modulator described above and shown in FIG. 1, are compatible with integration with a semiconductor laser. For instance, a phase modulator and DFB laser could be integrated, the guide layer of the phase modulator providing a cladding layer of the laser.

The electrical conditions required for a laser, which is forward biased rather than reverse biased as for an electo-optic device, would mean electrical separation would need to be provided. This could be achieved by providing insulating material between the p-doped layers of the laser and the n-doped layers of the modulator. For instance, after completion of the growth and etching steps, limited proton bombardment could be applied to the appropriate region.

Figure 3:
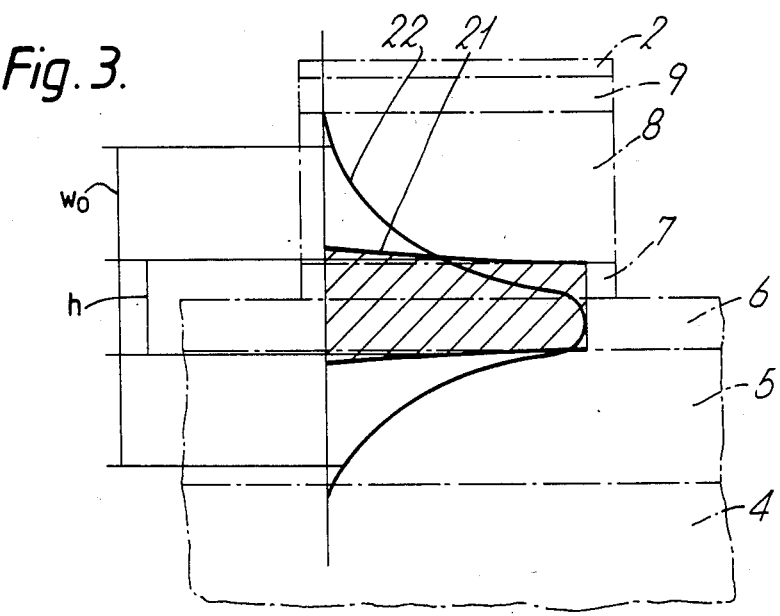
FIG. 3 shows amplitude profiles of an optical and an electrical field in the phase modulator in use.

The voltage of the electrical field in an electro-optic device having regions of low- and high-doped material, as described above and shown in FIG. 1, has a substantially rectangular profile. Referring to FIG. 3, the electrical field profile 21 (shown shaded) has a steep flank at the p-n junction in the cladding layers 7, 8, and at the interface between the guide layer 6 and the buffer layer 5, these flanks being determined by the relative doping levels of the buffer, guide and cladding layers 5, 6, 7, 8. The width h of the electrical field profile 21 is taken for the purposes of the present specification as the distance between the points at which the electrical field profile 21 equals half its maximum amplitude.

Because of the relative doping levels in the materials of the waveguide, the width of the electrical field profile 21 remains substantially as shown even over a range of voltages from 0 to 20 V, although its magnitude will vary.

The optical field profile 22 is shown normalised to the electrical field profile 21 in FIG. 3. It extends well beyond the electrical field profile 21, into the upper cladding layer 8 and the buffer layer 5. In the plane of the cross section of FIG. 3 it has a beam spot size $w_o$ measured between the 1/e amplitude points.

Calculations have been done to investigate how the profiles 21, 22 of the electrical and optical fields, and the relative positions of the fields, influence the change in modal propagation constant, $\beta$, per volt of applied electrical field. It has been found that the figure of merit for a device, the amount of change in $\beta$ that can be induced for a specified voltage V ($d\beta/V$), is the product of two independent terms: one determined by the basic properties of the material of the waveguide, and one determined by the magnitude and relative positions of the optical and electrical fields. The latter term is may be called the overlap factor, f (though not to be confused with the overlap integral of the electrical and optical fields).

Figure 4:
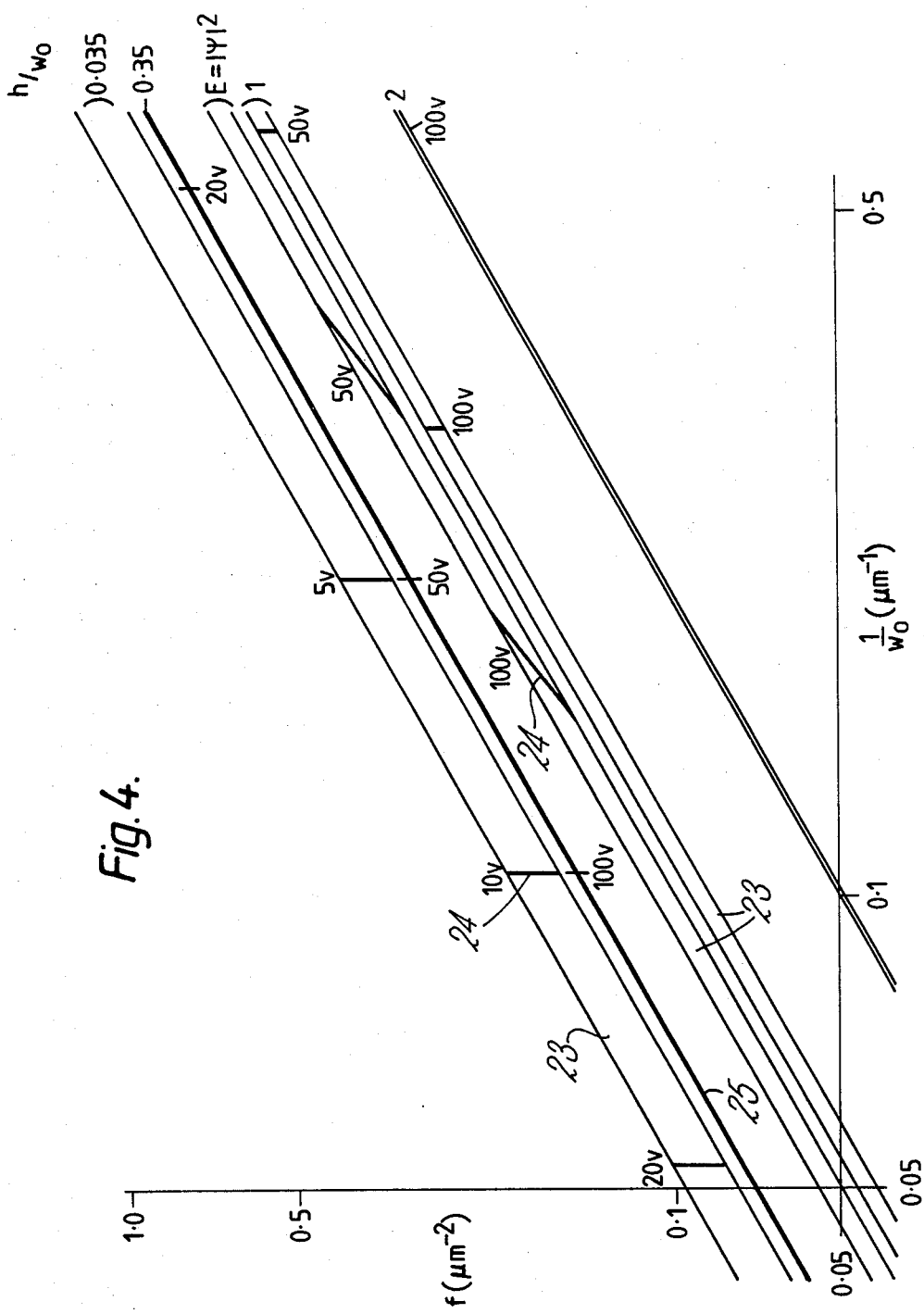
FIG. 4 shows a figure of merit (f) calculated for a variety of phase modulators according to embodiments of the present invention, plotted against the inverse of the beam spot size $w_o$.

Referring to FIG. 4, the overlap factor f was calculated for an electro-optic device of the general type described above with reference to FIG. 1, having an electrical field profile 21 of width h and an optical field profile 22 corresponding to a beam spot width $w_o$. f was plotted against $1/w_o$ for different values of $h/w_o$, on logarithmic scales.

For each value of the ratio $h/w_o$ a band 23 of allowed values of f is generated by varying the thickness of the guide layer 6, t, and the numerical aperture of the waveguide. The bands 23 of allowed values are generated because a waveguide may produce a particular beam spot size $w_o$ in an infinite number of ways. Although $w_o$ is fixed, the mode shape changes slightly as t and the numerical aperture are varied. This results in bands of values of f for each $h/w_o$ where a unique straight line might be expected.

Only the region of single mode operation is considered, and the onset of the first order mode determines one band edge for each $h/w_o$ ratio. The other band edge is defined by the limit t tends to 0. For the values of $h/w_0$ less than 0.35 the limit t tends to 0 gives the upper band edge, and the multimode condition corresponds to the lower edge, whilst for $h/w_o$ more than 0.35 the reverse is true. At $h/w_o=0.35$ the band degenerates to a single line 25 as shown in FIG. 4. All the band edges are characterized by an inverse dependence on spot size $w_o$. It will be noted that the highest values of f are obtained for the case h tends to 0 and small values of guide layer thickness t. Using an approximation for $w_o$ for small values of t, in the limit h tends to zero, $f=2/w_o$. Corresponding expressions for all other band edges can be derived.

It is clear from FIG. 4 that optimum values of f are obtained when h, the width of the electrical field profile 21, is as small as possible. f is maximised for any specific $w_o$ when $h/w_o=0$, although in practice this cannot be achieved because of electrical breakdown.

Assuming a rectangular electrical field profile, for each value of h there is an associated voltage $V_b$ given by $E_b h$, where $E_b$ is the electric field at which avalanche breakdown occurs in the semiconductor material. For small values of h, $V_b$ can be small, and this will limit the $d\beta$ that can be induced. Thus on FIG. 4 lines 24 corresponding to several breakdown voltages have been incorporated. The value of $E_b$ depends on a variety of factors such as doping level and the exact doping profile, but for simplicity a value of $E_b=3\times 10^5$ V/cm has been taken to give broad guidance as to the maximum voltage possible for any particular values of $w_o$ and h. Although f will increase as $h/w_o$ decreases, the maximum voltage will reduce, and this will set a maximum $d\beta$. These considerations are particularly important for short devices where high voltages may be needed to obtain a useful phase shift.

As an example of the use of the calculations, the case of a GaAs waveguide with a 10 μm mode size, specified to operate at a voltage not exceeding 10 V may be taken. For operation at $\lambda=1.55$ μm, the figure of merit $d\beta/V$ will be 1.22 f radians/Vcm (f is in $\mu m^{-1}$ as in FIG. 4). From FIG. 4 it can be seen that when h=0.35 μm $d\beta/V$ will be between 0.19 and 0.234 radians/Vcm. As the breakdown voltage is 10 V, the maximum $d\beta$ will be between 1.9 and 2.4 radians/cm. It is interesting to compare this result with the case when the electrical and optical fields 21, 22 overlap perfectly, when the maximum change in $\beta$ at 10 V is only between 1.22 and 1.34 radians/cm.

It is shown by the calculations that the figure of merit for an electro-optic device, given by $d\beta/V$, depends on the width $w_o$ of the optical field profile 22 and the distance h over which the electrical field is applied. The case when the electric field and optical field have a perfect overlap does not give the best result. It is found that the optimum performance is obtained when the electric field is applied over a very thin region, although the maximum change in propagation constant is limited by the onset of electrical breakdown.

In the above description, the spatial spreads of the electrical and optical fields have only been considered along one direction in an electro-optic device, the "measurement direction". In the phase modulator 1 described, the measurement direction is that between the electrode 2 and the exposed surface of the substrate 4. It is preferable, however, that the electrical field in the plane across the waveguide, perpendicular to the measurement direction, should be substantially uniform, at least across the width of the beam in that plane. It is not necessary that the cross section of the optical beam in the waveguide should have circular symmetry and $w_o$ applies only to the beam spot size in the measurement direction.

We claim:

1. An electro-optic device having an optical waveguide for transmitting an optical beam in a predetermined direction of propagation, the device comprising:
   a plurality of layers extending in the direction of propagation and means for applying an electric field perpendicular to the layers and transverse to the direction of propagation;

said plurality of layers comprising a pair of first boundary layers having a lower refractive index than respective inwardly adjacent layers and defining an optical confinement region therebetween and second boundary layers having substantially higher electrical doping levels than respective inwardly adjacent layers and defining an electrical confinement region therebetween;

the electrical confinement region being substantially narrower than and within the optical confinement region.

2. The device of claim 1 in which the electrical confinement region is less than one third of the width of the optical confinement region.

3. The device of claim 1 in which the electrical confinement region is less than one tenth of the width of the optical confinement region.

4. The device of claims 1, 2 or 3 in which the layers comprise group III and group V semiconductors.

5. The device of claims 1, 2 or 3 in which the electrical confinement region is substantially symmetrically disposed within the optical confinement layer.

6. The device of claim 1, 2 or 3 in which the higher electrical doping level is at least five times greater than the inwardly adjacent layer.

7. The device of claim 1, 2 or 3 in which the higher electrical doping level is at least an order of magnitude greater than the inwardly adjacent layer.

8. An electro-optic device having an optical waveguide for transmitting an optical beam in a predetermined direction of propagation, the device comprising:

a plurality of layers extending in the direction of propagation and means for applying an electrical field perpendicular to the layers and transverse to the direction of propagation, said beam having a beam spot size transverse to the direction of propagation and perpendicular to the layers of $W_o$ and said plurality of layers comprising boundary layers on each side of a region that contains the peak optical beam amplitude that have substantially higher electrical doping layers than said region containing the peak optical amplitude, and the spacing between the boundary layers being substantially less than the beam spot size $W_o$.

9. The device of claim 8 in which the spacing between the boundary layers is less than one third of $W_o$.

10. The device of claim 8 in which the spacing between the boundary layers is less than one tenth of the $W_o$.

11. The device of claim 8, 9 or 10 in which the layers comprise group III and group V semiconductors.

12. The device of claim 8, 9 or 10 in which the boundary layers are substantially symmetrically disposed with respect to the optical amplitude profile.

13. The device of claim 8, 9 or 10 in which the higher electrical doping level is higher at least by a factor of five.

14. The device of claim 8, 9 or 10 in which the higher electrical doping level is higher by at least by an order of magnitude.

15. An electro-optic device having an optical waveguide for transmitting an optical beam in a predetermined direction of propagation, the device comprising:

a plurality of layers extending in the direction of propagation and means for applying an electric field perpendicular to the layers and transverse to the direction of propagation, said beam having a beam spot size transverse to the direction of propagation and perpendicular to the layers of $W_o$, and said layers including a reverse biased pn junction having a depletion region that lies within a region that contains the peak amplitude and extends perpendicular to the layers for a distance substantially less than $W_o$.

16. The device of claim 15 in which the depletion region is substantially symmetrical with respect to the amplitude profile of the beam.

17. The device according to claim 15 or 16 in which the device comprises a ridge waveguide comprising group III-V semiconductors.

18. The device of claim 15 or 16 in which the thickness of the depletion region is determined by boundary layers having substantially different electrical doping levels.

19. The device of claim 15 or 16 in which the thickness of the depletion layer is an order of magnitude less than $W_o$.

* * * * *